(12) United States Patent
Joung et al.

(10) Patent No.: US 9,486,958 B2
(45) Date of Patent: Nov. 8, 2016

(54) APPARATUS FOR ADHERING A SOFT SLAB AND A COVERING MATERIAL TOGETHER

(71) Applicant: Hyundai Dymos Incorporated, Seosan, Chungcheongnam-Do (KR)

(72) Inventors: Ha Gyun Joung, Gyeonggi-Do (KR); Jin Bae Cho, Seoul (KR); Man Ho Lee, Gyeonggi-Do (KR)

(73) Assignee: Hyundai Dymos Incorporated, Seosan, Chungcheongnam-do (KR)

( * ) Notice: Subject to any disclaimer, the term of this patent is extended or adjusted under 35 U.S.C. 154(b) by 337 days.

(21) Appl. No.: 14/267,489

(22) Filed: May 1, 2014

(65) Prior Publication Data

US 2014/0238611 A1   Aug. 28, 2014

Related U.S. Application Data

(63) Continuation of application No. PCT/KR2012/008995, filed on Oct. 30, 2012.

(30) Foreign Application Priority Data

Nov. 1, 2011   (KR) .................. 10-2011-0112746

(51) Int. Cl.
*B29C 65/78* (2006.01)
*B32B 37/00* (2006.01)
(Continued)

(52) U.S. Cl.
CPC ........... *B29C 65/7894* (2013.01); *B32B 9/025* (2013.01); *B32B 37/0007* (2013.01);
(Continued)

(58) Field of Classification Search
CPC ............ Y10T 156/1734; B32B 37/22; B32B 37/0007; B32B 38/1858; B65H 29/242; B29C 65/7894

USPC ......................................................... 156/552
See application file for complete search history.

(56) References Cited

U.S. PATENT DOCUMENTS 4,020,881 A * 5/1977 Nothen .................. A01G 9/081
141/1
4,997,507 A   3/1991 Meyer
(Continued)

FOREIGN PATENT DOCUMENTS

CN   1541833 A   11/2004
CN   101418522 A   4/2009
(Continued)

OTHER PUBLICATIONS

European Search Report for European Application No. 12846142.3, dated Oct. 12, 2015, 5 pages.
(Continued)

*Primary Examiner* — Philip Tucker
*Assistant Examiner* — John Blades
(74) *Attorney, Agent, or Firm* — Mintz Levin Cohn Ferris Glovsky and Popeo, P.C.; Peter F. Corless (57) ABSTRACT

The present invention relates to an apparatus for adhering a soft slab and a covering material together. The apparatus for adhering the soft slab and the covering material together includes: a moving unit consisting of a plurality of rollers for moving the soft slab; a conveyor unit including a belt configured such that air passes through the top and bottom surface thereof, and a driving unit for driving the belt, the conveyor unit being intended for transferring a covering material seated on the top surface of the belt toward an adhesive surface of the soft slab; and an air suction unit provided at the bottom surface of the belt so as to suction air such that the covering material is tightly attached onto the top surface of the belt, thereby attaching the covering material onto the adhesive surface of the soft slab without generating pleats.

11 Claims, 5 Drawing Sheets

(51) Int. Cl.
  *B32B 9/02* (2006.01)
  *B32B 38/18* (2006.01)
  *B65H 29/24* (2006.01)
  *B65H 29/00* (2006.01)
  *B65H 39/14* (2006.01)
  *B32B 37/06* (2006.01)
  *B32B 37/22* (2006.01)
  *B32B 37/12* (2006.01)

(52) U.S. Cl.
  CPC ......... *B32B38/1858* (2013.01); *B65H 29/006* (2013.01); *B65H 29/242* (2013.01); *B65H 39/14* (2013.01); *B32B 37/06* (2013.01); *B32B 37/1284* (2013.01); *B32B 37/22* (2013.01); *B32B 2305/022* (2013.01); *B32B 2317/08* (2013.01); *B32B 2601/00* (2013.01); *B65H 2301/4191* (2013.01); *B65H 2301/41912* (2013.01); *B65H 2301/44734* (2013.01); *B65H 2701/178* (2013.01); *B65H 2701/194* (2013.01)

(56) References Cited

U.S. PATENT DOCUMENTS

| | | | |
|---|---|---|---|
| 5,026,172 A | 6/1991 | Candore | |
| 5,868,891 A * | 2/1999 | Weir | B05C 5/027 118/211 |
| 2006/0073006 A1 * | 4/2006 | Ikemoto | B31B 19/98 414/789.9 |

FOREIGN PATENT DOCUMENTS

| | | |
|---|---|---|
| CN | 201456518 U | 5/2010 |
| CN | 102126634 A | 7/2011 |
| DE | 3507667 A1 | 8/1987 |
| JP | S57185150 A | 11/1982 |
| KR | 10-0053588 B1 | 8/1992 |
| KR | 10-0257977 B1 | 6/2000 |
| KR | 20-0302469 Y1 | 1/2003 |
| KR | 10-2006-0017187 A | 2/2006 |
| KR | 10-2011-0056815 A | 5/2011 |
| KR | 10-2011-0099365 A | 9/2011 |
| SG | 173472 A1 | 9/2011 |
| WO | 2010/003960 A1 | 1/2010 |

OTHER PUBLICATIONS

Chinese Office Action for Chinese Application No. 201280065006.6, issued Mar. 23, 2015, 4 pages.

* cited by examiner

APPARATUS FOR ADHERING A SOFT SLAB AND A COVERING MATERIAL TOGETHER

CROSS-REFERENCE TO RELATED APPLICATION

The present application is a continuation of International Application No. PCT/KR2012/008995 filed on Oct. 30, 2012, which claims priority to Korean Application No. 10-2011-0112746 filed on Nov. 1, 2011, which applications are incorporated herein by reference.

TECHNICAL FIELD

The present invention relates to an apparatus for adhering a soft slab and a covering material which is used to manufacture a leather seat for vehicles or the like.

BACKGROUND ART

Seats for vehicles include a frame provided in a seat, a cushion coupled to the frame, and a covering which covers the cushion. Not only seats for vehicles, but general seats also include a frame, a cushion and a covering which covers the cushion.

Such a covering may directly cover a cushion in such a way that a covering material is manufactured using synthetic leather or natural leather and then merely sewn to the cushion. Recently, particularly, with regard to vehicles or the like, a technique by which a covering for use in covering a vehicle seat is manufactured by coupling synthetic leather or natural leather to a slab made of soft sponge or the like is widely used.

Basically, this is to improve seating comfort. In other words, this technique aims to provide predetermined elasticity and flexibility to even a covering which covers a cushion that typically has elasticity and flexibility, thus improving seating comfort, and enhancing the durability of the covering by virtue of increased shock absorption performance of the covering itself.

Such a covering includes a soft slab and a covering material disposed on the slab. The covering material may be coupled to the slab by only sewing the perimeter of the covering material to the slab. Alternatively, the covering material may adhere to the surface of the slab with the entirety of the covering material in close contact with the slab.

In the case of the covering material coupled to a slab by sewing, such covering materials are stretched over time by repeated seating. Because of this, the covering material may form creases and detach from the slab which it covers. To avoid these problems, a technique by which the entirety of the covering material is adhered to the soft slab while being in close contact with the soft slab has recently used.

However, in this technique, only synthetic leather, that is, only a covering material that can be manufactured in any shape and form, can be used. Because natural leather is not uniform in its original shape, it is fundamentally impossible to manufacture a roll of natural leather, so that natural leather has not been used in the technique by which the entity of the covering material is adhered to the soft slab.

Therefore, a technique for manufacturing a seat covering is required, which can effectively adhere natural leather to a soft slab and reliably fix the natural leather in a place and bring the natural leather into close contact with the soft slab without creasing during a process of adhering the natural leather to the slab, even if the natural leather has an unevenly cut shape rather than being supplied in a predetermined width from a roll, whereby the marketability of the product can be markedly improved.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the prior art, and an object of the present invention is to provide an apparatus for adhering a soft slab and a covering material together which is used to manufacture a seat covering and can effectively adhere a covering material including natural leather to a soft slab and, particularly, reliably fix a covering material in place and bring the covering material into close contact with the soft slab without creasing during a process of adhering the natural leather to the slab, whereby the marketability of the seat covering can be markedly enhanced.

In order to accomplish the above object, the present invention provides an apparatus for adhering a soft slab and a covering material together, including: a moving unit comprising a plurality of rollers and moving the soft slab; a conveyor unit comprising a belt configured to allow air to pass through upper and lower surfaces thereof, and a drive unit provided to move the belt, the conveyor unit transferring the covering material placed on the upper surface of the belt towards an adhesive surface of the soft slab; and an air suction unit provided below the lower surface of the belt, the air suction unit sucking air such that the covering material comes into close contact with the upper surface of the belt whereby the covering material adheres to the adhesive surface of the soft slab without creasing.

The apparatus may further include a heating unit heating the adhesive surface of the soft slab that is moved by the moving unit, wherein the conveyor unit may transfer the covering material towards the adhesive surface that has been heated.

The apparatus may include an adhesive applying unit applying an adhesive to the adhesive surface of the soft slab that is moved by the moving unit, wherein the conveyor unit may transfer the covering material towards the adhesive surface to which the adhesive has been applied.

The soft slab may be made of sponge, and the covering material may be made of natural leather.

The moving unit may include a feed roll and a collecting roll respectively disposed at both sides of the apparatus, and a guide roller 160 provided between the feed roll and the collecting roll, the guide roller guiding the adhesive surface of the soft slab to a position adjacent to the covering material placed on the upper surface of the belt of the conveyor unit to enable the covering material to adhere to the adhesive surface of the soft slab.

The moving unit may further include a compression roller provided between the collecting roll and the guide roller, the compression roller compressing the soft slab to which the covering material has adhered.

A plurality of vent holes may be formed in the belt of the conveyor unit to enable air to pass through the upper and lower surfaces of the belt.

The belt of the conveyor unit may be made of porous material to enable air to pass through the upper and lower surfaces of the belt.

The drive unit of the conveyor unit may transfer the belt in a direction equal to a direction in which the soft slab is transferred, whereby the covering material placed on the belt is transferred in the direction equal to the direction in which the soft slab is transferred, and then adheres to the adhesive surface of the soft slab.

The drive unit may comprise drive units respectively provided at front and rear positions, the drive units circulating the belt, and the air suction unit may be installed between the drive units below the lower surface of the belt, the air suction unit sucking air from the upper surface of the belt towards the lower surface thereof.

The apparatus may further include a covering jig including a covering seating depression having a shape equal to a shape of the covering material, wherein the covering material may be seated into the covering seating depression, and the covering jig may be placed on the upper surface of the belt of the conveyor unit and transferred towards the adhesive surface of the soft slab.

The covering jig may be configured such that air can pass through upper and lower surfaces thereof, whereby the covering materials in the covering seating depression is brought into close contact with the covering jig by the air suction unit so that the covering material can adhere to the adhesive surface of the soft slab without creasing.

In an apparatus for adhering a soft slab and a covering material together according to the present invention, even when the covering material is made of natural leather, the covering material can be transferred while being evenly spread and then attached to the soft slab without creasing. Therefore, the apparatus according to the present invention makes it possible to manufacture a seat covering that has improved marketability.

Furthermore, in the present invention, an automated process is used, so that even if natural leather which is irregular in shape is used as the covering material, the number of processes can be markedly reduced. Particularly, the apparatus can reduce the steps required to spread natural leather covering materials and fix the covering material in place to attach the covering materials to the soft slab, thereby greatly improving productivity.

DETAILED DESCRIPTION

Hereinafter, an apparatus for adhering a soft slab and a covering material according to predetermined embodiments of the present invention will be described in detail with reference to the attached drawings.

Figure 1:
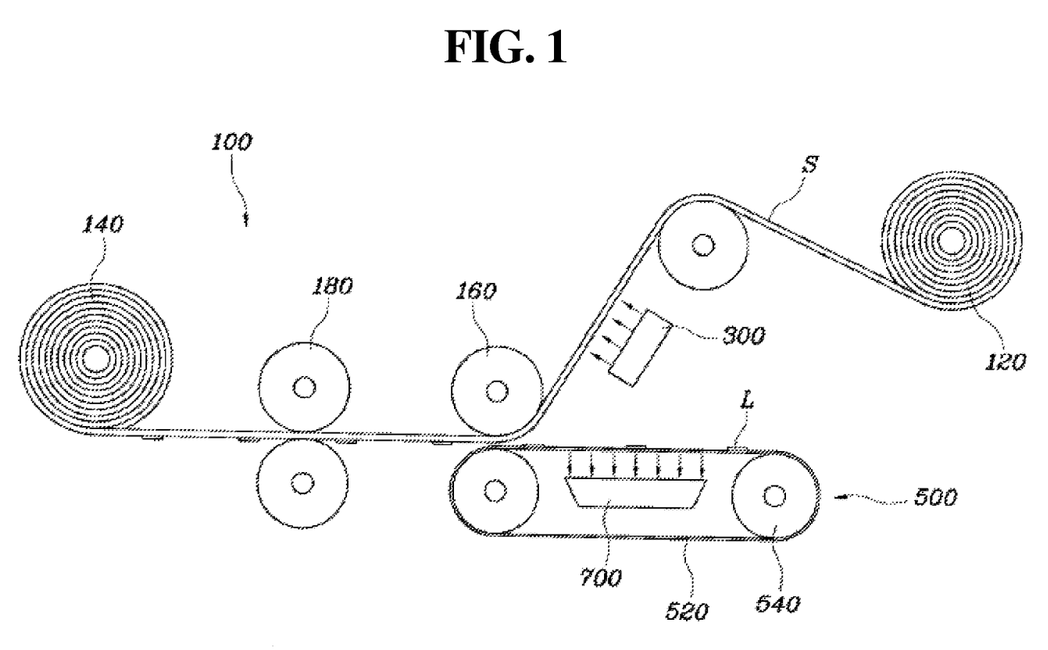
FIG. 1 is a view illustrating an apparatus for adhering a soft slab and a covering material together according to a first embodiment of the present invention.

FIG. 1 is a view illustrating an apparatus for adhering a soft slab and a covering material together according to a first embodiment of the present invention. The apparatus for adhering the soft slab and the covering material together according to the present invention includes: a moving unit 100 which includes a plurality of rollers and moves the soft slab S; a conveyor unit 500 which includes a belt 520 configured to allow air to pass through upper and lower surfaces thereof, and a drive unit 540 provided to move the belt 520, and which is configured to transfer the covering material placed on the upper surface of the belt 520 towards an adhesive surface of the soft slab; and an air suction unit 700 which is provided below the lower surface of the belt 520 so as to suck air such that the covering material comes into close contact with the upper surface of the belt 520 whereby the covering material can adhere to the adhesive surface of the soft slab S without creasing.

The apparatus may further include a heating unit 300 which heats the adhesive surface of the soft slab S that is moved by the moving unit 100. In this case, the apparatus is configured in such a way that the conveyor unit 500 transfers the covering material to the adhesive surface of the soft slab S that has been heated by the heating unit 300. Alternatively, the apparatus may further include an adhesive applying unit 300 which applies adhesive to the adhesive surface of the soft slab S that is moved by the moving unit 100. In this case, the apparatus is configured in such a way that the conveyor unit 500 transfers the covering material to the adhesive surface of the soft slab S to which adhesive has been applied.

Although the covering material may be adhered to the soft slab by means of adhesive applied to the adhesive surface of the soft slab, in this embodiment, the apparatus and method of adhering the covering material to the soft slab in such a way that the adhesive surface of the soft slab is heated and then the covering material adheres to the heated adhesive surface of the soft slab will be described in detail.

In an embodiment, the soft slab S is made of sponge, and the covering material L is made of natural leather. As stated above, the soft slab S functions to cover a seat for vehicles. Particularly, the soft slab S covers a cushion of the seat to provide a double shock absorption structure to the seat and enhance the durability of the seat. The covering material L functions as a finishing material and is thermally fused to the adhesive surface of the soft slab such that the covering material L can be tautly maintained for a long period of time without creasing. Particularly, with regard to a natural leather product which is irregular in shape, form and flatness, the present invention is effective in maintaining the quality of the product constant.

The reason for this is that because of irregularity in shape of natural leather, it is very difficult to adhere it to the soft slab S without creasing. In the present invention, the covering material L made of natural leather is transferred while being brought into close contact with the belt by means of the air suction unit 700 and then attached to the melted adhesive surface of the soft slab S with close contact with the soft slab S. Therefore, the covering material L can be thermally fused to the soft slab S while maintaining flatness. Thereby, a clean product can be produced without creases on the surface of the product. In the case of typical synthetic leather, because it is provided from a roll in the same manner of that of the slab, it can be reliably attached to the slab without creasing by only a simple transferring and adhering processes. However, with regard to natural leather, it is difficult to evenly adhere it to the slab via a simple transferring and adhering processes without creasing. Thus, additional handwork and correction work has been required in the conventional technique.

On the other hand, in the present invention, because the air suction unit 700 enhances the degree to which the covering material made of natural leather comes into close contact with the slab, even if a worker only places the covering material on the belt 520, the covering material made of natural leather can be transferred with close contact with the belt and attached to the slab without creases. Therefore, the completeness of the product and the productivity can be markedly enhanced, compared to the manual work.

The moving unit 100 includes a feed roll 120 and a collecting roll 140 which are disposed at both sides of the apparatus, and a guide roller 160 which is provided between the feed roll 120 and the collecting roll 140 and guides the adhesive surface of the soft slab S to a position adjacent to the covering material placed on the upper surface of the belt 520 of the conveyor unit so that the covering material can adhere to the adhesive surface of the soft slab S.

The soft slab S is provided in a form of roll. In this embodiment, the soft slab S is unwound from the feed roll 120 and is wound around the collecting roll 140 after the covering material adheres to the soft slab S. Disposed between the feed roll 120 and the collecting roll 140, the guide roller 160 guides the soft slab S towards the covering material L so that the covering material can adhere to the melted adhesive surface of the soft slab S. Preferably, the guide roller 160, along with a rear drive roller of the conveyor unit 500 which moves the covering material, compresses the soft slab S to which the covering material has been attached. That is, the covering material is attached to the soft slab S by the guide roller 160 and the rear drive roller of the conveyor unit 500 and, simultaneously, the soft slab S and the covering material are compressed together by them.

Furthermore, the moving unit 100 may further include a compression roller 180 which is provided between the collecting roll 140 and the guide roller 160 to compress the soft slab S to which the covering material has been attached.

The compression roller 180 may comprise a pair of compression rollers 180 which compress the upper and lower surfaces of the soft slab S at the same time. In this case, the soft slab S can be double-compressed whereby the covering material and the soft slab S can be more reliably coupled to each other.

Meanwhile, a plurality of vent holes are formed in the belt 520 of the conveyor unit 500 so that air can pass through the upper and lower surfaces of the belt 520. Through the vent holes, the covering material L can be brought close contact with the belt 520 by the air suction unit 700 which is provided below the lower surface of the belt 520. By virtue of this construction, even if a worker only places the covering material L on the belt 520, as the belt 520 is transferred, the covering material L is smoothly spread on the belt 520 and brought into close contact with the belt 520 while passing through the air suction unit 700. In this state, the covering material adheres to the soft slab S. Therefore, it becomes possible for the covering material to adhere to the soft slab S without creasing. Furthermore, the belt 520 of the conveyor unit 500 may be made of porous material so that air can more reliably pass through the upper and lower surfaces of the belt 520.

The drive unit 540 of the conveyor unit 500 transfers the belt 520 in the same direction as a direction in which the soft slab S is transferred, whereby the covering material that is placed on the belt 520 can be transferred in the same direction as that of the soft slab S and then adheres to the adhesive surface of the soft slab S.

The drive unit 540 comprises two drive units which are respectively provided in front and rear ends of the conveyor unit and circulate the belt 520. The air suction unit 700 is disposed between the two drive units 540 below the lower surface of the belt 520 so as to suck air from the upper surface of the belt 520 towards the lower surface thereof.

Figure 2:
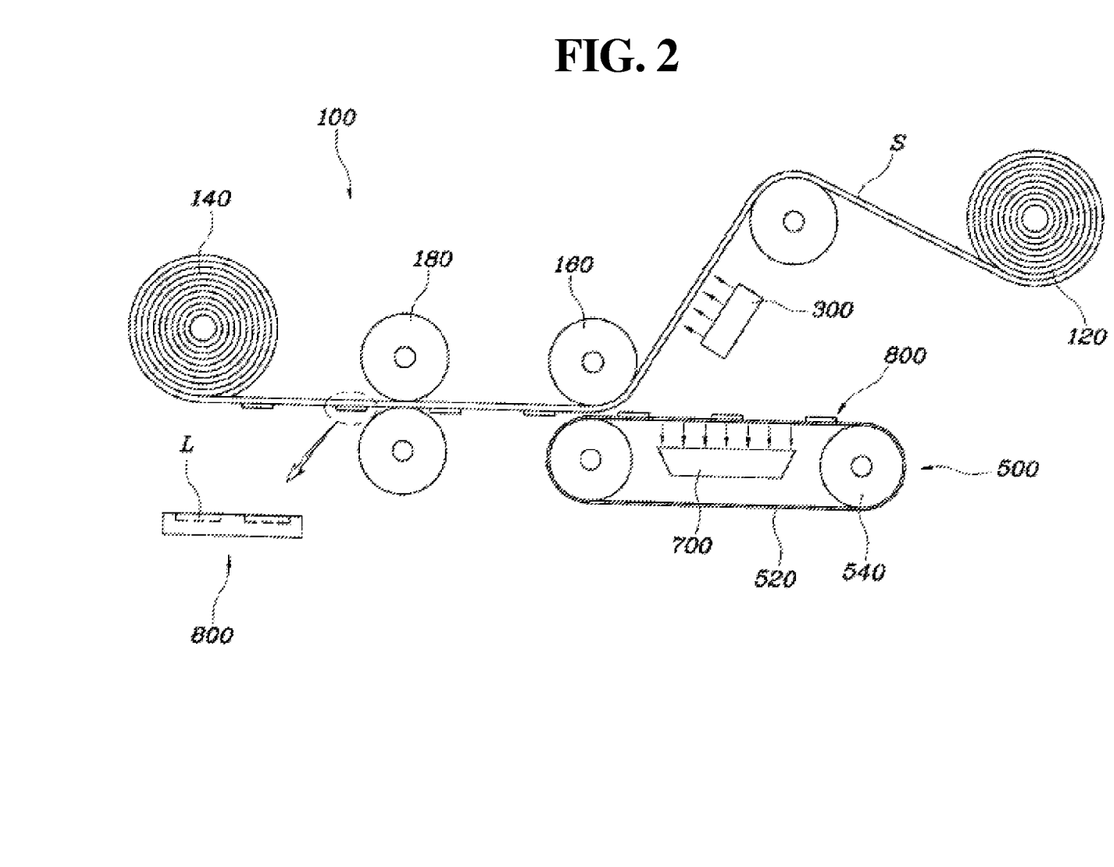
FIG. 2 is a view illustrating an apparatus for adhering a soft slab and a covering material together according to a second embodiment of the present invention.
Figure 4:
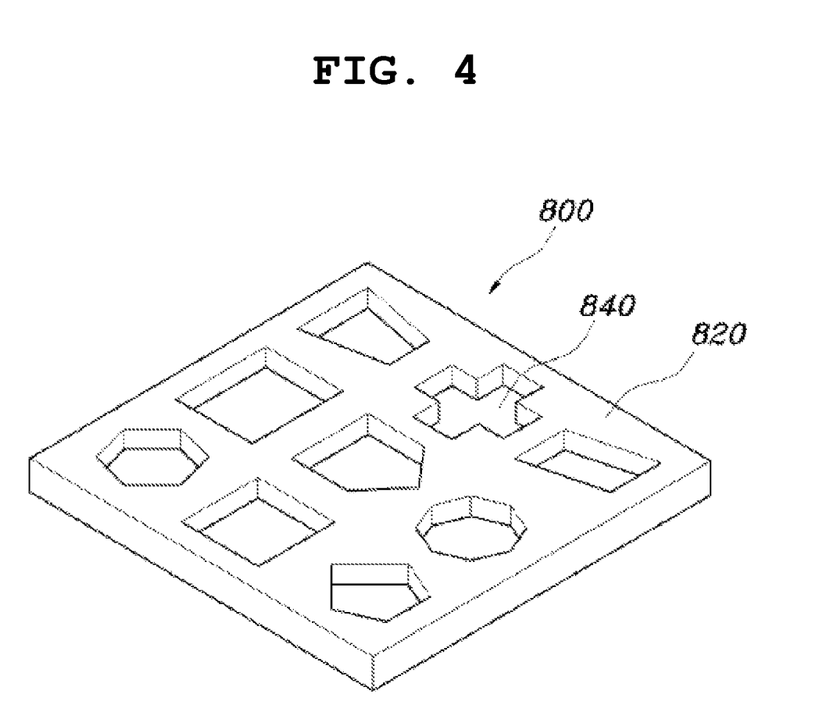
FIG. 4 is a view illustrating a covering jig used in the apparatus for adhering a soft slab and a covering material together according to the present invention.
Figure 5:
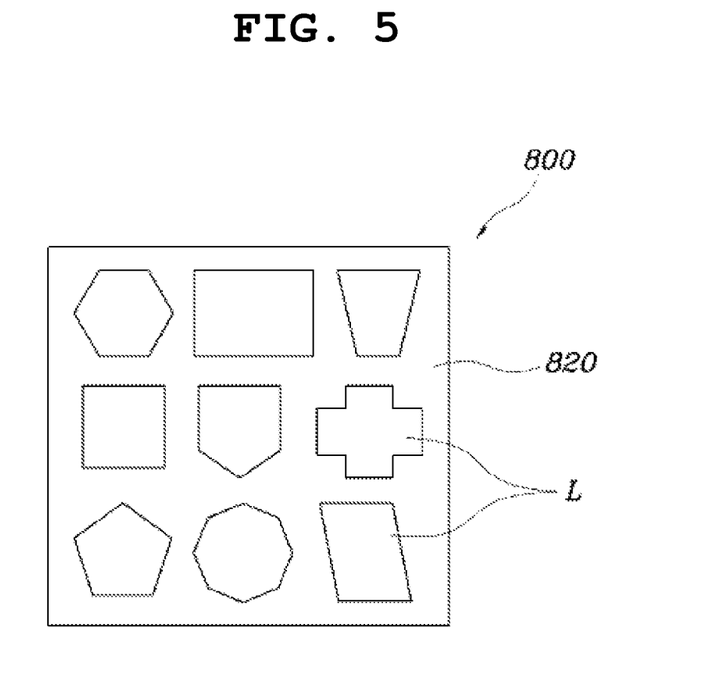
FIG. 5 is a view showing natural leather sheets seated in the covering jig of FIG. 4.

FIG. 2 is a view illustrating an apparatus for adhering a soft slab and a covering material together according to a second embodiment of the present invention. FIG. 4 is a view illustrating a covering jig used in the apparatus for adhering the soft slab and the covering material together according to the present invention. FIG. 5 is a view showing natural leather sheets seated in the covering jig of FIG. 4. The apparatus for adhering the soft slab and the covering material together according to the second embodiment further includes the covering jig 800 which has in an upper surface thereof covering seating depressions 840 having the same shapes of corresponding covering materials L. The covering jig 800 is placed on the belt 520 of the conveyor unit 500 and moved towards the adhesive surface of the soft slab S with the covering materials L seated into the covering seating depressions 840.

The covering jig 800 includes a jig body 820 which has a predetermined thickness, and the covering seating depressions 840 which are formed in the jig body 820 and have predetermined depths. The covering seating depressions 840 have shapes corresponding to those of various covering materials L. Particularly, the covering jig 800 is placed on the belt 520 with the covering materials L seated in the corresponding covering seating depressions 840, and the covering materials L are attached to the adhesive surface of the soft slab S while the covering jig 800 is transferred by the belt 520. After the covering materials L have been attached to the soft slab S, the covering jig 800 may be returned and reused.

The covering jig 800 is configured such that air can pass through upper and lower surfaces of the covering jig 800. Thus, the covering materials L in the covering seating depression 840 can be brought into close contact with the covering jig 800 by the air suction unit 700 whereby the covering materials L can adhere to the adhesive surface of the soft slab S without creasing.

That is, the present invention is configured such that air can pass through not only the covering jig 800 but also the belt 520. Thus, the covering materials L can be brought into close contact with the covering jig 800 by the air suction unit 700, whereby the covering materials L can be transferred while being evenly spread and can be attached to the adhesive surface of the soft slab S without creasing.

Figure 3:
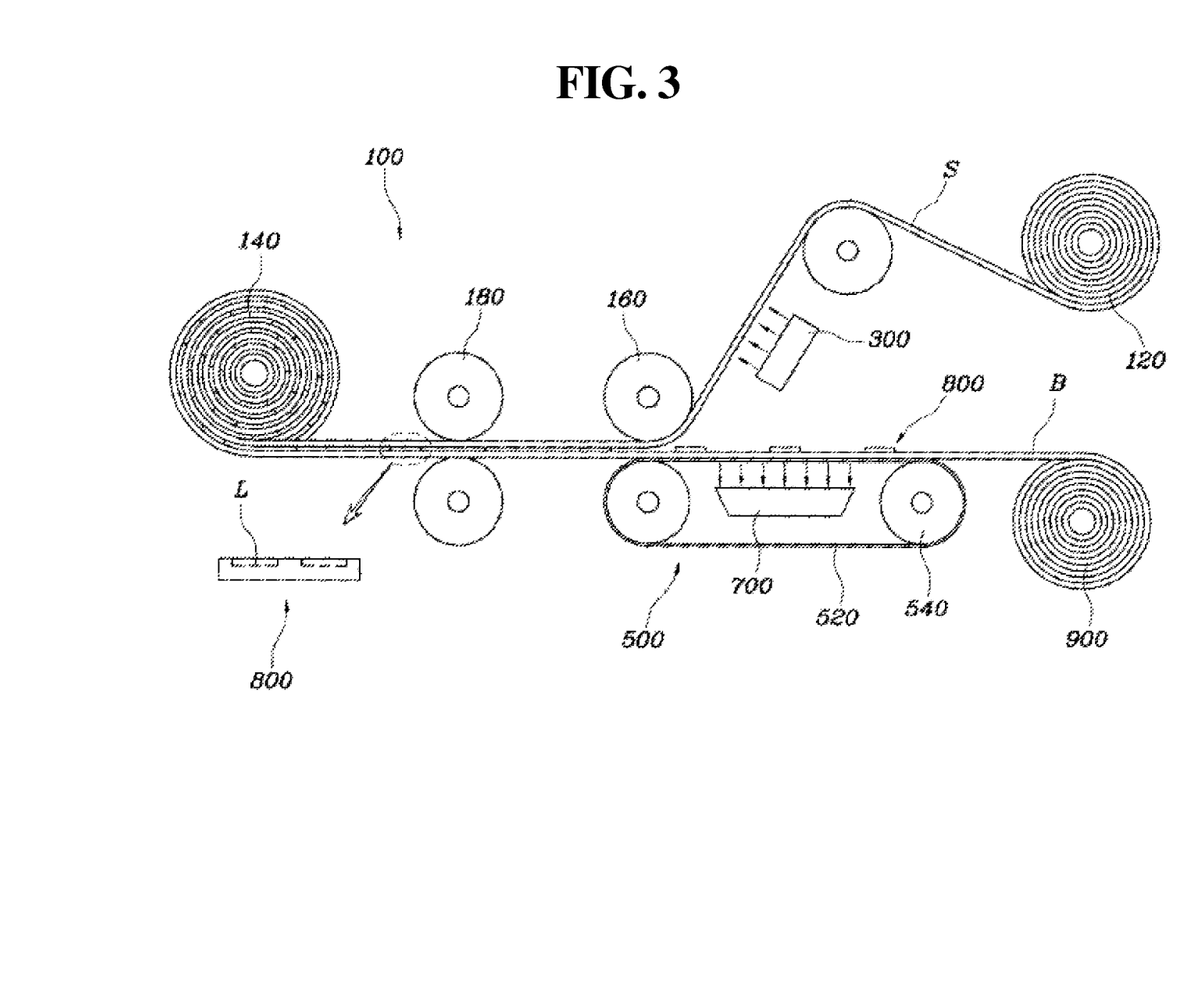
FIG. 3 is a view illustrating an apparatus for adhering a soft slab and a covering material together according to a third embodiment of the present invention.

FIG. 3 is a view illustrating an apparatus for adhering a soft slab and a covering material together according to a third embodiment of the present invention. In this embodiment, a coating roll 900 is disposed below the lower surface of the soft slab S. Unwound from the coating roll 900, a coating material B is attached to the adhesive surface of the soft slab S. The covering material L is adhered between the slab S and the coating material B. The coating material B may be used as a film for protecting the covering material L or, alternatively, as a packing material. Furthermore, although the coating material B is supplied from the separate coating roll 900, the coating material B along with the slab S is wound around the collecting roll 140 for the slab S. Furthermore, as shown in the drawing, the covering material L and the slab S may adhere to each other in such a way that after the covering materials L have been seated into the covering jig 800, the covering materials L and the covering jig 800 adhere to the soft slab 5, and later the coating material B and the covering jig 800 are removed together from the soft slab S.

As described above, in an apparatus for adhering a soft slab and a covering material together according to the present invention, even if a covering material is made of natural leather which has various shapes and forms, it can be transferred while being evenly spread and then attached to the slab. Therefore, a natural leather seat covering that has improved marketability can be produced without creases as if it were synthetic leather.

Furthermore, an automated process is used, so that even if natural leather which is irregular in shape is used as the covering material, the number of processes can be markedly reduced. Particularly, the apparatus can reduce the steps required to spread natural leather covering materials and fix each covering material in place to attach the covering materials to the soft slab, thereby contributing greatly to improvement in productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus for adhering a soft slab and a covering material together, comprising:
    a moving unit (100) comprising a plurality of rollers and moving the soft slab (S);
    a conveyor unit (500) comprising a belt (520) configured to allow air to pass through upper and lower surfaces thereof, and a drive unit (540) provided to move the belt (520), the conveyor unit (500) transferring the covering material placed on the upper surface of the belt (520) towards an adhesive surface of the soft slab;
    an air suction unit (700) provided below the lower surface of the belt (520), the air suction unit (700) sucking air such that the covering material comes into close contact with the upper surface of the belt (520) whereby the covering material adheres to the adhesive surface of the soft slab (S) without creasing; and
    a covering jig (800) including a covering seating depression (840) having a shape equal to a shape of the covering material (L), wherein the covering material (L) is seated onto the covering seating depression (840), and the covering jig (800) is placed on the upper surface of the belt (520) of the conveyor unit (500) and transferred towards the adhesive surface of the soft slab (S).

2. The apparatus of claim 1, further comprising
    a heating unit (300) heating the adhesive surface of the soft slab (S) that is moved by the moving unit (100),
    wherein the conveyor unit (500) transfers the covering material (L) towards the adhesive surface that has been heated.

3. The apparatus of claim 1, further comprising
    an adhesive applying unit (300) applying an adhesive to the adhesive surface of the soft slab (S) that is moved by the moving unit (100),
    wherein the conveyor unit (500) transfers the covering material (L) towards the adhesive surface to which the adhesive has been applied.

4. The apparatus of claim 1, wherein the soft slab (S) is made of sponge, and the covering material is made of natural leather.

5. The apparatus of claim 1, wherein the moving unit (100) comprises a feed roll (120) and a collecting roll (140) respectively disposed at both sides of the apparatus, and a guide roller 160 provided between the feed roll (120) and the collecting roll (140), the guide roller (160) guiding the adhesive surface of the soft slab (S) to a position adjacent to the covering material placed on the upper surface of the belt (520) of the conveyor unit to enable the covering material to adhere to the adhesive surface of the soft slab.

6. The apparatus of claim 5, wherein the moving unit (100) further comprises a compression roller (180) provided between the collecting roll (140) and the guide roller (160), the compression roller (180) compressing the soft slab (S) to which the covering material has adhered.

7. The apparatus of claim 1, wherein a plurality of vent holes are formed in the belt (520) of the conveyor unit (500) to enable air to pass through the upper and lower surfaces of the belt.

8. The apparatus of claim 1, wherein the belt (520) of the conveyor unit (500) is made of porous material to enable air to pass through the upper and lower surfaces of the belt.

9. The apparatus of claim 1, wherein the drive unit (540) of the conveyor unit (500) transfers the belt (520) in a direction equal to a direction in which the soft slab (S) is transferred, whereby the covering material placed on the belt (520) is transferred in the direction equal to the direction in which the soft slab (S) is transferred, and then adheres to the adhesive surface of the soft slab (S).

10. The apparatus of claim 9, wherein the drive unit (540) comprises drive units respectively provided at front and rear positions, the drive units circulating the belt (520), and the air suction unit (700) are installed between the drive units (540) below the lower surface of the belt (520), the air suction unit (700) sucking air from the upper surface of the belt (520) towards the lower surface thereof.

11. The apparatus of claim 1, wherein the covering jig (800) is configured such that air can pass through upper and lower surfaces thereof, whereby the covering materials (L) in the covering seating depression (840) is brought into close contact with the covering jig (800) by the air suction unit (700) so that the covering material (L) can adhere to the adhesive surface of the soft slab (S) without creasing.

* * * * *